United States Patent [19]

Carlson

[11] 4,075,094
[45] Feb. 21, 1978

[54] SODIUM HYPOCHLORITE TREATMENT FOR REMOVAL OF CYANURATE COMPOUNDS FROM AQUEOUS WASTE STREAMS

[75] Inventor: Ronald H. Carlson, Willingboro, N.J.

[73] Assignee: FMC Corporation, Philadelphia, Pa.

[21] Appl. No.: 704,051

[22] Filed: July 9, 1976

[51] Int. Cl.$^2$ .............................................. C02B 1/36
[52] U.S. Cl. ................................. 210/62; 210/63 R; 544/192; 544/194
[58] Field of Search ................... 210/12, 18, 42 R, 50, 210/56, 59, 61–63 R; 260/248 A, 248 C

[56] References Cited

U.S. PATENT DOCUMENTS

| 3,732,164 | 5/1973 | Pressley et al. ..................... 210/61 |
| 3,878,208 | 4/1975 | Carlson et al. ................. 260/248 C |
| 3,907,794 | 9/1975 | Carlson et al. ................. 260/248 A |
| 3,926,795 | 12/1975 | Saldick ................................. 210/12 |

FOREIGN PATENT DOCUMENTS 345,103   8/1972   U.S.S.R. ............................... 210/56

Primary Examiner—Charles N. Hart
Assistant Examiner—Peter A. Hruskoci
Attorney, Agent, or Firm—Robert W. Kell; Frank Ianno

[57] ABSTRACT

Aqueous waste streams from the production of chlorinated isocyanurates are oxidized with sodium hypochlorite to remove therefrom dissolved cyanurate compounds.

26 Claims, 2 Drawing Figures

SODIUM HYPOCHLORITE TREATMENT FOR REMOVAL OF CYANURATE COMPOUNDS FROM AQUEOUS WASTE STREAMS

This invention relates to the purification of aqueous waste streams containing triazines such as cyanuric acid and ammelide.

Chlorinated isocyanuric acids and their alkali metal salts are familiar chemical entities which are useful as a source of active chlorine. Especially important members are sodium dichloroisocyanurate and trichloroisocyanuric acid. These are high-purity, white crystalline solids, available in a variety of mesh sizes. Although active oxidizers, they can be handled and transported with relative ease and safety. One of the important commercial applications of these products is in the area of water treatment where they have proved effective and convenient for controlling algae and pathogenic bacteria. The water in swimming pools, for example, is readily maintained in a clean and sanitary condition by the addition of chlorinated cyanuric acid derivatives. Other volume uses are as a dry bleach in cleansing, laundering and sanitizing compositions and the like.

Alkali metal dichloroisocyanurates and trichloroisocyanuric acid are produced commercially by the chlorination in aqueous media of alkali metal cyanurates. The process is well known and documented exclusively in the technical and patent literature and in this connection reference is made to U.S. Pat. Nos. 3,299,060, 2,969,360, and 3,035,056. The principal reactions involved, omitting intermediate stages and species, can be depicted by the following simplified chemical equation in which the alkali metal is sodium:

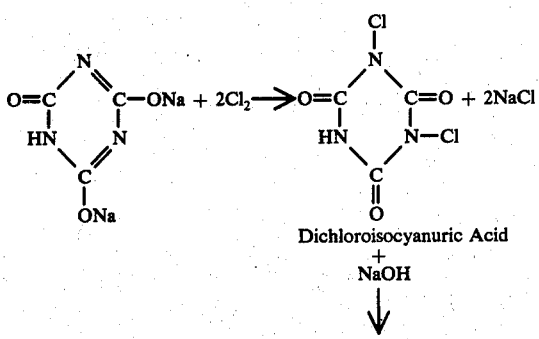

Dichloroisocyanuric Acid
+
NaOH

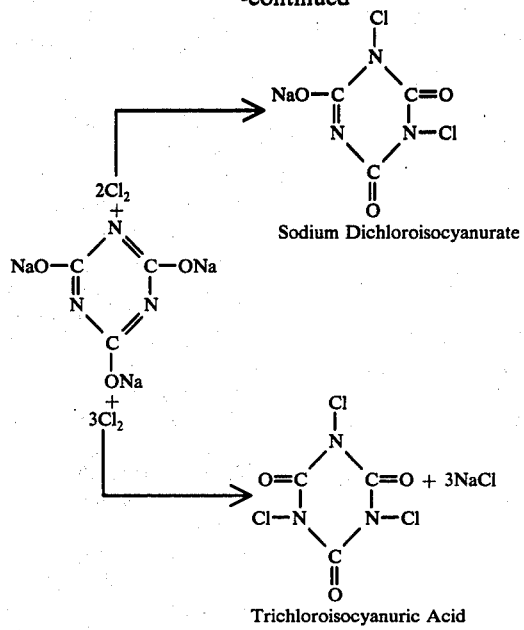

Sodium Dichloroisocyanurate

Trichloroisocyanuric Acid

The chlorination can be carried out by passing chlorine through an aqueous slurry of the di- or trisodium cyanurate thereby forming the corresponding di- or trichloroisocyanuric acid. These are filtered from the reaction mixture and the resulting filtrate, which contains up to about 2.0 percent dissolved chlorinated isocyanuric acids, constitutes an acid waste stream having a pH range of about 0.5 to 5.0. The dichloroisocyanuric acid is neutralized with base, e.g. aqueous sodium hydroxide and the so-formed sodium dichloroisocyanurate filtered off. The filtrate from the neutralization contains up to about 25 percent dissolved chlorinated sodium isocyanurate and constitutes a near neutral waste stream having a pH range of about 6.5 to 7.0.

Alternatively, the sodium dichloroisocyanurate can be realized directly by selective chlorination of trisodium cyanurate wherein two of the sodiums are replaced with chlorine while the third sodium remains attached to the cyanurate ring. The waste stream from this operation exhibits a pH in the vicinity of 5.0 to 7.5. In general, the pH of chlorinated isocyanurate waste streams will run from about 0.5 to 7.5. Where a neutral and an acid waste stream are produced these may be combined to yield a single waste stream.

Of all the chlorinated isocyanurate derivatives, sodium dichloroisocyanurate enjoys the greatest commercial usage since it possesses such desirable attributes as stability, water solubility and high available chlorine content. Although essentially water-insoluble, trichloroisocyanuric acid has the highest available chlorine and because of this may be preferred for certain applications. Generally speaking, however, both derivatives are important industrial chemicals.

While entirely satisfactory from a purely technical aspect, the manufacture of sodium dichloroisocyanurate and trichloroisocyanuric acid is accompanied by the production of aqueous waste streams containing dissolved cyanurates, the pollution-free disposal of which presents a special problem. A practical solution to this difficulty is a requirement for a commercially successful operation.

The increasing public concern over the pollution of our lakes and streams, coupled with the adoption of Federal, State, and local regulations governing the discharge of waste materials has occasioned increased effort in developing new and improved processes and systems for treating waste streams prior to discharge.

One approach to the problem is to heat the aqueous waste stream in a pressure vessel at about 225° C to 275° C to hydrolyze and decompose the cyanurate compounds, as described in U.S. Patent Application Ser. No. 569,019, filed Apr. 17, 1975 in the name of Sidney Berkowitz and Charles V. Juelke and assigned to the assignee of the instant application. Although this process is highly effective in eliminating from the waste stream all trace of cyanurate compounds, it is costly in terms of energy input. In addition, the ammonia that is formed by decomposition of the cyanurate compounds is in itself a pollutant.

Another approach to the problem is to treat the aqueous waste stream with active carbon powder as described in U.S. Pat. No. 3,835,136. The active carbon was found to exhibit a strong affinity for dissolved cyanurate compounds so that they were removed from the waste streams upon contact. Although this process effectively cleans up the waste stream, the need to purchase and handle large quantities of active carbon powder increases operating costs. The disadvantage is partially off-set by recycling cyanurate values recovered from the exhausted carbon. Even so, the process is not as economically attractive as might be desired and further improvements in the treatment of chlorinated isocyanurate waste streams are being actively pursued.

Yet another method for removing dissolved chlorinated cyanurate compounds from aqueous waste streams is described in U.S. Pat. No. 3,878,208. That patent discloses a method of dechlorinating the waste stream by treatment with hydrogen peroxide. It is an advantage of this process that the cyanuric acid (or its sodium salt) precipitates from the waste stream and may be recycled back to the chlorination zone. Approximately 65 to 98% of the cyanurate compounds dissolved in the waste streams are recovered in this manner. However the waste stream, after the solid cyanurate values have been precipitated, retains in solution a low level of organic matter — of the order of 200 to 3,000 ppm.

SUMMARY OF THE INVENTION

The present invention provides a means for reducing the levels of cyanurate compounds present in the chlorinator waste stream to less than 15 ppm by reaction of the waste stream with sodium hypochlorite in either a batch or continuous process, and has particular application to the treatment of such waste streams that have been dechlorinated with hydrogen peroxide to reduce soluble cyanuric acid levels from 2 percent to 200–3,000 ppm. Further oxidation of such waste streams, containing as much as 3,000 ppm of cyanurate compounds with sodium hypochlorite can result in an effluent that meets zero nitrogen discharge requirements. The reaction rate is related to such variables as pH, temperature, initial concentration of cyanurate compounds and initial sodium hypochlorite concentration. Excess sodium hypochlorite can be subsequently destroyed by reaction with hydrogen peroxide.

It has now been discovered that ammelide and cyanurate compounds such as cyanuric acid can be removed from aqueous waste streams by treatment with sodium hypochlorite solution. The amount of sodium hypochlorite used, the temperature and the pH at which the waste stream is maintained during contact with the sodium hypochlorite solution are critical for maximum process performance.

In carrying out the invention, sufficient sodium hypochlorite is added to the waste stream liquor to chemically oxidize the cyanuric acid or its sodium salt to carbon dioxide. The chemistry of the reaction of sodium hypochlorite with cyanuric acid may be represented by the following equation indicating a 4.5 to 1 molar stoichiometry of sodium hypochlorite to cyanuric acid.

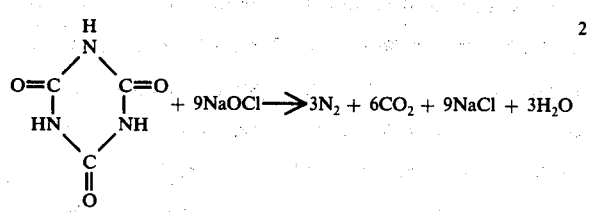

On a weight basis, this reaction requires a ratio of 259.5 parts by weight of sodium hypochlorite to 100 parts by weight of cyanuric acid. At least 90 percent of the cyanuric acid nitrogen is oxidized to nitrogen gas, the balance being oxidized mostly to nitrates. The reaction of sodium hypochlorite with cyanuric acid proceeds most rapidly at pH 9.0 to 10 and increases in rate 2-3 times for every 10° increase in temperature. The effect of the initial concentration of cyanuric acid and sodium hypochlorite on the reaction rate will be discussed below. The residence time for destruction of 95 percent of the cyanuric acid present in the waste stream can range from more than 200 hours to less than 5 minutes depending upon the reaction conditions.

Cyanurate compounds that may be removed from aqueous waste streams by the process of this invention include cyanuric acid, alkali metal salts of cyanuric acid, and amide derivatives of cyanuric acid such as ammelide.

The waste streams that may be advantageously treated by the process of this invention may contain up to about 2 percent of dissolved cyanurate compounds. Typical solutions will contain from 200 to 3,000 ppm of cyanurate compounds. Other soluble compounds may also be present in the waste stream such as sodium chloride (up to 10 percent by weight), sodium bicarbonate, ammonium dihydrogen orthophosphate, ammonium bisulfate, sodium nitrate, hydrochloric acid, sulfuric acid and orthophosphoric acid.

The process of the present invention has application to solutions ranging in the pH from essentially 0 to 12. However, the waste stream should be adjusted to a pH of from 8 to 12 prior to contact with the sodium hypochlorite solution. The preferred operating range of the process of the present invention is between about 9 and 11. Particularly preferred is an operating pH in the range of 9.0 to 10.

The amount of sodium hypochlorite reacted with the waste stream may range from a low of about 2 moles of sodium hypochlorite per mole of cyanurate compound present in the waste stream to as much as 9 moles of sodium hypochlorite per mole of cyanurate compound present in the waste stream. Preferred operating conditions require a molar stoichiometry of sodium hypochlorite to cyanurate between 6 to 1 and 8 to 1. The source of the sodium hypochlorite reactant may be either sodium hypochlorite added as such, gaseous or liquid chlorine, hypochlorous acid, or nitrogen chlorinated isocyanuric acid derivatives.

In addition to cyanuric acid, other triazines such as ammelide may be destroyed by the process of this invention. The chemistry of the reaction of sodium hypochlorite with ammelide may be represented by the following equation indicating a 6 to 1 molar stoichiometry of sodium hypochlorite to ammelide.

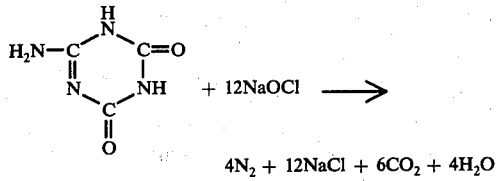

$$4N_2 + 12NaCl + 6CO_2 + 4H_2O$$

The benefits and advantages of the present invention will become apparent upon a reading of the description of the preferred embodiments taken in conjunction with the accompanying drawings, wherein.

The invention is illustrated in greater detail by the following non-limiting examples in which all percentages are by weight unless specified otherwise.

EXAMPLE I

One hundred parts by weight of a simulated waste effluent composition containing 0.3 percent cyanuric acid, 6 percent sodium chloride and 0.5 percent hydrochloric acid is mixed with 12.4 parts by weight of 5.25 percent sodium hypochlorite solution and the pH is adjusted to 10.5. The weight ratio of the sodium hypochlorite to the cyanuric acid present in solution is 217:100. This mixture is stirred at room temperature for a period of 2 hours, during which time extensive gassing is observed due to the elimination of nitrogen. During this reaction the pH of the mixture decreases to 10.0-10.1 due to decomposition of the cyanuric acid to form carbon dioxide and conversion of the carbon dioxide to sodium carbonate and sodium bicarbonate. The pH of the effluent is periodically readjusted during the reaction to pH 10.5 by addition of 10 percent sodium hydroxide solution. After the simulated waste effluent composition had been stirred for 2 hours, it is treated with hydrogen peroxide to destroy residual sodium hypochlorite and subsequently acidified and heated at pH 2 to dispell carbon dioxide. The solution following this treatment is analyzed for cyanuric acid and found to contain 0.113 percent indicating that about 63 percent of the cyanuric acid present in the simulated waste solution was degraded. No ammonia or chloramine odors are detected in the solution during the two hour reaction.

EXAMPLE II

A number of batch experiments are conducted with a simulated waste effluent containing 480 ppm cyanuric acid and 6 percent sodium chloride. One hundred parts by weight of this simulated waste effluent is reacted with 1.19 parts by weight of 10.8 percent sodium hypochlorite solution at room temperature under varying conditions of pH and reactor residence time. The pH of the simulated waste effluent is maintained at the desired level by the addition of 10 percent sodium hydroxide solution as described above in Example I. The data from this Example appear in Table I below and show a good correlation between the decomposition of cyanuric acid and sodium hypochlorite, thus substantiating the 4.5 to 1 sodium hypochlorite to cyanuric acid molar stoichiometry.

TABLE I

Hypochlorite Destruction of Cyanuric Acid In Simulated Waste Effluent
Conditions: 4.5/1 mole ratio NaOCl/CA*
Initial CA ≃ 480 ppm
6% NaCl
Gentle Agitation

| Run No. | pH | Temperature (°C) | Reaction Time (Hrs) | % CA Decomposition | % NaOCl Decomposition |
|---|---|---|---|---|---|
| 1 | 11.5 | 22 | 0.5 | 6.9 | — |
| 2 | 10.5 | 22 | 1.0 | 14.7 | — |
| 3 | 10.0 | 22 | 1.0 | 28.8 | — |
| 4 | 9.5 | 22 | 1.0 | 23.2 | 22.8 |
| 5 | 9.0 | 22 | 1.0 | 12.0 | 8.3 |
| 6 | 11.0 | 20 | 6.0 | 26.0 | 33.5 |
| 7 | 10.0 | 20 | 6.0 | 58.1 | 47.4 |
| 8 | 9.0 | 20 | 6.0 | 12.1 | 8.9 |

*CA = cyanuric acid

Figure 1:
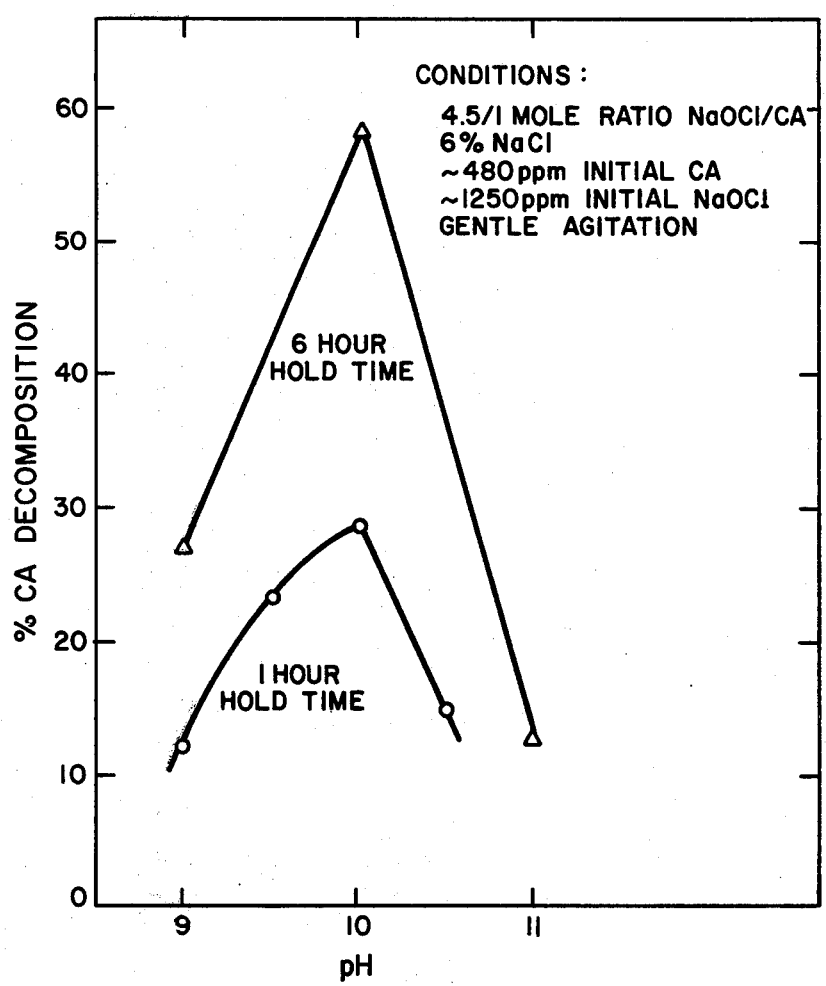
FIG. 1 is a graph that illustrates the effect of pH on the rate of cyanuric acid decomposition in the presence of sodium hypochlorite.

The data in the above table are plotted in FIG. 1 and suggest that under stoichiometric operating conditions at about 20° C the reaction rate reaches a maximum at a pH value between 9 and 10.

EXAMPLE III

A simulated waste effluent containing 1,714 milligrams per liter of cyanuric acid and about 6 percent by weight of sodium chloride is treated with a solution containing 4,804 milligrams of sodium hypochlorite. The molar ratio of sodium hypochlorite to cyanuric acid is 4.86:1 (an 8 percent excess of sodium hypochlorite). The decomposition rate (25° C) is measured at pH 8.5, 9.5 and 10.5. The residual undecomposed cyanuric acid present in the simulated waste solution is measured by total Kjeldahl nitrogen analysis. These data are listed in Table II below which shows the advantage of close pH control at about pH 9.5 for maximum rate at a temperature of 25° C.

TABLE II

Effect of pH on Rate of Decomposition of Cyanuric Acid With Sodium Hypochlorite
Conditions: 25° C
NaOCl/CA mole ratio 4.86/1
Initial CA 1,714 mg/l

| Elapsed Time (Hours) | % CA Decomposition | | |
|---|---|---|---|
| | pH 8.5 | pH 9.5 | pH 10.5 |
| 1 | 22 | 53 | 14 |
| 2 | 27 | 71 | 15 |
| 4 | 36 | 85 | 21.5 |
| 6 | 44 | 92 | 26 |
| 8 | 51 | 95 | — |
| 10 | 55.5 | 96.5 | — |
| 12 | 59 | 97 | — |

EXAMPLE IV

A simulated waste effluent containing 1,714 milligrams per liter of cyanuric acid and about 6 percent by weight of sodium chloride is treated with a solution containing 4,804 milligrams of sodium hypochlorite (an 8 percent excess). The decomposition rate is measured at temperatures of 12°, 25° and 35° C while maintaining the operating pH of the solution at 9.5. The data listed in Table III below show that the reaction rate increases markedly between 12° and 35° C.

TABLE III

Effect of Temperature on Rate of Decomposition of Cyanuric Acid With Sodium Hypochlorite Conditions: pH 9.5
NaOCl/CA mole ratio 4.86/1
Initial CA 1,714 mg/l

| Elapsed Time (Hours) | % CA Decomposition | | |
|---|---|---|---|
| | 12° C | 25° C | 35° C |
| 1 | 18 | 53 | 74 |
| 2 | 32 | 72 | 88 |
| 4 | 46.5 | 85 | — |
| 6 | 56 | 92 | — |
| 8 | 64.5 | 95 | — |
| 10 | 72 | 96.5 | — |
| 12 | 78 | 97 | — |

EXAMPLE V

To evaluate the effect of changing the initial molar ratio of sodium hypochlorite added to the cyanuric acid waste stream, a simulated waste effluent containing 1,714 milligrams per liter of cyanuric acid and about 6 percent by weight sodium chloride is treated with a solution containing 2,175 milligrams of sodium hypochlorite. The molar ratio of sodium hypochlorite to cyanuric acid is 2.2:1. The mixture is agitated for 4 hours while maintaining the temperature at 25° C and the pH at 9.5. Fifty-one percent of the cyanuric acid is decomposed.

This experiment is repeated increasing the amount of sodium hypochlorite from 2,175 milligrams to 9,390 milligrams. The molar ratio of sodium hypochlorite to cyanuric acid is 9.5:1. The mixture is agitated for 4 hours while maintaining the temperature at 25° C and the pH at 9.5. Ninety-one percent of the cyanuric acid is decomposed.

EXAMPLE VI

Figure 2:
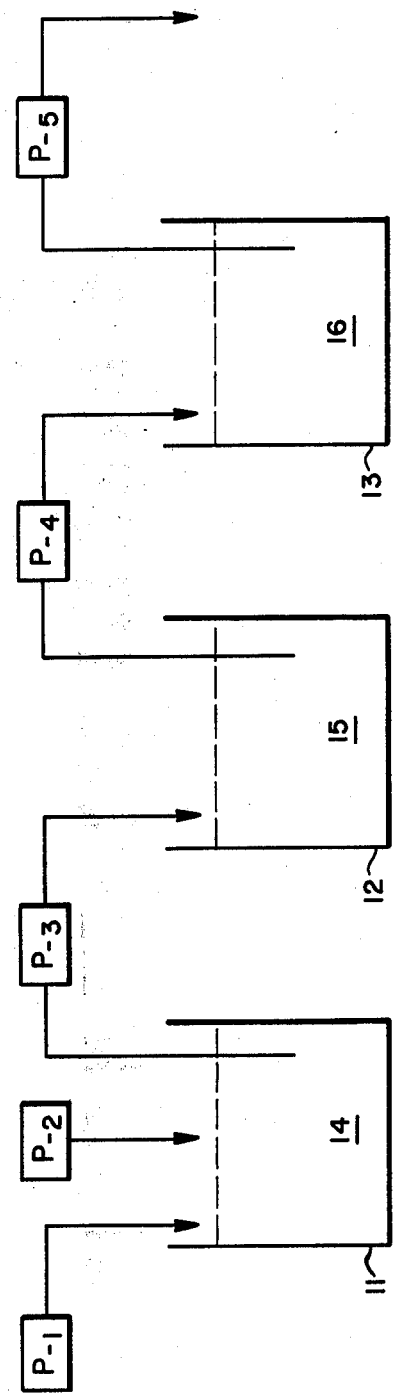
FIG. 2 illustrates a continuous process for treating a waste stream containing cyanurate compounds in accordance with the process of the present invention.

This Example and FIG. 2 describe a continuous process for treating a waste effluent containing cyanuric acid compounds with sodium hypochlorite. Referring now to FIG. 2 containers 11, 12 and 13 are 2½ gallon battery jars, each of which contains 8 liters of 6 percent sodium chloride solution. Vessel 11 contains 100 ppm of cyanuric acid and 0.02 moles per liter of sodium hypochlorite. Vessel 12 contains 40 ppm of cyanuric acid, and 0.017 moles per liter of sodium hypochlorite. Vessel 13 contains 15 ppm cyanuric acid and 0.014 moles per liter of sodium hypochlorite. The levels of cyanuric acid and sodium hypochlorite present in containers 11, 12 and 13 represent typical concentration obtained under continuous steady-state operating conditions.

The contents 14, 15 and 16 of each of the three vessels 11, 12 and 13 are maintained at 45° C with gentle stirring and the pumps (P-1 through P-5) are started. The pump P-1 is adjusted to deliver 63 ml per minute of a 6 percent sodium chloride solution containing 660 ppm of cyanuric acid to the container 11. The pump P-2 is adjusted to deliver 4 ml per minute of an aqueous 0.64 molar sodium hypochlorite solution to the container 11. The pumps P-3, P-4 and P-5 are adjusted to maintain 8 liters of solution in each of the vessels 11, 12 and 13. The pH in each of the reactor vessels 14, 15 and 16 is maintained at 9.5 ± 0.2 for 12 hours. After six hours of operation the total Kjeldahl nitrogen in the three vessels is determined. The residual cyanuric acid and the amount of cyanuric acid decomposed in each of the vessels is described in Table IV.

TABLE IV

| Vessel | Cyanuric Acid Present | Decomposed (%) |
|---|---|---|
| 11 | 147 ppm | 92 |
| 12 | 31 ppm | 98 |
| 13 | 6 ppm | 99 |

Operation of the three-vessel continuous system described above reduces the organic nitrogen content (as cyanuric acid) from 200 ppm to less than 5 ppm in 6 hours at 45° C, in 3 hours at 55° C, or in ½ hour at 85° C. The pH is an important variation and should be controlled to 9.5 ± 0.5 when operating in the temperature range of 45° to 85° C. The amount of sodium hypochlorite most effective in the continuous process described by this Example is between 6.8 and 9.0 moles of sodium hypochlorite per mole of cyanuric acid (a 50 percent to 100 percent excess).

EXAMPLE VII

To 4,240 parts of 6 percent sodium chloride solution is added 2.4 parts of ammelide and the pH is adjusted to 9.5. Seventy parts of a 14.3 percent sodium hypochlorite solution is added and the temperature is increased to 45° C with gentle agitation while maintaining the pH at 9.5. After 15 minutes a sample of solution is removed and analyzed for ammelide content by U.V. spectroscopy. The analysis indicated 106 ppm of residual ammelide corresponding to 81 percent decomposition during the 15 minute interval.

Pursuant to the requirements of the patent statutes, the principle of this invention has been explained and exemplified in a manner so that it can be readily practiced by those skilled in the art, such examplificiation including what is considered to represent the best embodiment of the invention. However, it should be clearly understood that, within the scope of the appended claims, the invention may be practiced by those skilled in the art, and having the benefit of this disclosure otherwise than as specifically described and exemplified herein. In the following claims, the term "cyanurate compounds" shall include but not be limited to ammelide and water soluble salts thereof.

What is claimed is:

1. A process of eliminating dissolved cyanurate compounds from waste liquors containing triazines such as cyanuric acid, ammelide, and chlorinated isocyanurates comprising adjusting the pH of said waste liquors within the range of 8 to 12, and adding thereto at a temperature below 55° C sufficient sodium hypochlorite to oxidize a major portion of said cyanurate compounds to nitrogen, carbon dioxide and sodium chloride.

2. The process according to claim 1 wherein the cyanurate compounds are cyanuric acid and water soluble salts thereof.

3. The process according to claim 1 wherein the cyanurate compounds are ammelide and water soluble salts thereof.

4. The process of claim 1 wherein the aqueous waste liquors are maintained at a pH in the range of 9.0 to 10.0.

5. The process of claim 1 wherein the waste liquors are maintained at a temperature in the range of 20°–55° C.

6. The process of claim 1 wherein the waste liquors contain about 200–3,000 ppm of cyanurate compounds prior to contact with the sodium hypochlorite solution.

7. The process of claim 1 wherein the waste liquors contain less than 15 ppm of cyanurate compounds after contact with the sodium hypochlorite solution.

8. The process according to claim 1 wherein the contact time is about 2-6 hours.

9. The process according to claim 1 wherein the molar ratio of sodium hypochlorite to the cyanurate compounds present in the waste liquors is between 6:1 and 8:1.

10. In the process of producing chlorinated isocyanurates by the chlorination in aqueous media of an alkali metal cyanurate to form the corresponding chlorinated cyanuric acid and aqueous waste liquors containing dissolved cyanurate compounds; the improvement of adjusting the pH of said waste liquors to within the range of 8-12, and contacting the waste liquors at a temperature below 55° C with sufficient sodium hypochlorite to oxidize a major portion of said cyanurate compounds to nitrogen, carbon dioxide and sodium chloride.

11. The process according to claim 10 wherein the cyanurate compounds are cyanuric acid and water soluble salts thereof.

12. The process according to claim 10 wherein the cyanurate compounds are ammelide and water soluble salts thereof.

13. The process of claim 10 wherein the aqueous waste liquors are maintained at a pH in the range of 9.0 to 10.0.

14. The process of claim 10 wherein the waste liquors are maintained at a temperature in the range of 20°-55° C.

15. The process of claim 10 wherein the waste liquors contain about 200-3,000 ppm of cyanurate compounds prior to contact with the sodium hypochlorite solution.

16. The process of claim 10 wherein the waste liquors contain less than 15 ppm of cyanurate compounds after contact with the sodium hypochlorite solution.

17. The process according to claim 10 wherein the contact time is about 2-6 hours.

18. The process according to claim 10 wherein the molar ratio of sodium hypochlorite to the cyanurate compounds present in the waste liquors is betweeen about 6:1 and 8:1.

19. In a process for removing dissolved cyanurate compounds from waste liquors resulting from the production of chlorinated isocyanurates said waste liquors having been dechlorinated with hydrogen peroxide to reduce soluble cyanuric acid levels to 200-3,000 ppm, the improvement which comprises, adjusting the pH of the dechlorinated waste liquors to within the range of 8-12 and subsequently contacting said waste liquors at a temperature below 55° C with sufficient sodium hypochlorite to oxidize a major portion of said cyanurate compounds present in the waste liquors to nitrogen, carbon dioxide and sodium chloride.

20. The process according to claim 19 wherein the cyanurate compounds are cyanuric acid and water soluble salts thereof.

21. The process according to claim 19 wherein the cyanurate compounds are ammelide and water soluble salts thereof.

22. The process of claim 19 wherein the aqueous waste liquors are maintained at a pH in the range of 9.0 to 10.0 during contact with the sodium hypochlorite solution.

23. The process of claim 19 wherein the waste liquors are maintained at a temperature in the range of 20°-55° C during contact with the sodium hypochlorite solution.

24. The process of claim 19 wherein the waste liquors contain less than 15 ppm of cyanurate compounds after contact with the sodium hypochlorite solution.

25. The process according to claim 19 wherein the contact time of said waste liquors with the sodium hypochlorite solution is about 2-6 hours.

26. The process according to claim 19 wherein the molar ratio of sodium hypochlorite to the cyanurate compounds present in the waste liquors is between 6:1 and 8:1.

* * * * *

UNITED STATES PATENT AND TRADEMARK OFFICE
CERTIFICATE OF CORRECTION

PATENT NO. : 4,075,094
DATED : February 21, 1978
INVENTOR(S) : Ronald H. Carlson It is certified that error appears in the above-identified patent and that said Letters Patent are hereby corrected as shown below:

Claim 1, line 2, "waste liquors" should read --aqueous waste liquors--. Claim 19, line 2, "waste liquors" should read --aqueous waste liquors--.

Signed and Sealed this

Fifth Day of September 1978

[SEAL]

Attest:

RUTH C. MASON
*Attesting Officer*

DONALD W. BANNER
*Commissioner of Patents and Trademarks*